(12) United States Patent
Trandal et al.

(10) Patent No.: US 7,409,048 B2
(45) Date of Patent: Aug. 5, 2008

(54) CALL PROCESSING AND SUBSCRIBER REGISTRATION SYSTEMS AND METHODS

(75) Inventors: David Trandal, Santa Barbara, CA (US); Robert Duva, Santa Barbara, CA (US); Robert F. Smith, Santa Barbara, CA (US); John R. Day, Santa Barbara, CA (US)

(73) Assignee: Callwave, Inc., Santa Barbara, CA (US)

( * ) Notice: Subject to any disclaimer, the term of this patent is extended or adjusted under 35 U.S.C. 154(b) by 671 days.

(21) Appl. No.: 11/008,779

(22) Filed: Dec. 9, 2004

(65) Prior Publication Data

US 2006/0126820 A1     Jun. 15, 2006

(51) Int. Cl.
*H04M 1/64* (2006.01)
(52) U.S. Cl. .............. 379/88.19; 379/114.1; 379/215.01
(58) Field of Classification Search ............... 379/88.19, 379/114.1, 215.01
See application file for complete search history.

(56) References Cited

U.S. PATENT DOCUMENTS

| | | | |
|---|---|---|---|
| 3,936,613 A | 2/1976 | Nishigori et al. |
| 3,956,595 A | 5/1976 | Sobanski |
| 4,009,337 A | 2/1977 | Sakai et al. |
| 4,022,983 A | 5/1977 | Braun et al. |
| 4,485,470 A | 11/1984 | Reali |
| 4,736,405 A | 4/1988 | Akiyama |
| 4,809,321 A | 2/1989 | Morganstein et al. |
| 4,845,743 A | 7/1989 | Lutz |
| 4,893,336 A | 1/1990 | Wuthnow |
| 4,994,926 A | 2/1991 | Gordon et al. |
| 5,040,208 A | 8/1991 | Jolissaint |
| 5,046,087 A | 9/1991 | Sakai |
| 5,259,022 A | 11/1993 | Kuok et al. |

(Continued)

FOREIGN PATENT DOCUMENTS

CA     1329852     9/1989

(Continued)

OTHER PUBLICATIONS

Johnson, Dave; Article; "Now You're Talking—voice—response systems for home offices—Product Information"; http://www.findarticles.com; Feb. 1999.

(Continued)

*Primary Examiner*—Gerald Gauthier
(74) *Attorney, Agent, or Firm*—Knobbe, Martens, Olson & Bear LLP

(57) ABSTRACT

The present invention relates to telecommunications, and in particular, to systems and processes for processing telephone calls and providing telephony services. In one embodiment, a call processing system, comprises a first telephony interface configured to receive a call from a caller, a storage device configured to store a greeting, and a call answering system. The call answering system is configured to play the greeting in response to receiving the call, record a voice message from the caller, determine when the caller has completed recording the voice message, after determining that the caller has completed recording the voice message, play a prompt regarding the caller becoming a subscriber to call services provided by the call processing system, receive from the caller information used to establish a call services account, and establish a call services account for the caller.

56 Claims, 4 Drawing Sheets

U.S. PATENT DOCUMENTS

| | | |
|---|---|---|
| 5,291,302 A | 3/1994 | Gordon et al. |
| 5,404,537 A | 4/1995 | Olnowich et al. |
| 5,434,908 A | 7/1995 | Klein |
| 5,459,584 A | 10/1995 | Redd, Jr. et al. |
| 5,467,388 A | 11/1995 | Redd, Jr. et al. |
| 5,526,524 A | 6/1996 | Madduri |
| 5,533,102 A | 7/1996 | Robinson et al. |
| 5,577,111 A | 11/1996 | Iida et al. |
| 5,583,918 A | 12/1996 | Nakagawa |
| 5,619,557 A | 4/1997 | Van Berkum |
| 5,640,677 A | 6/1997 | Karlsson |
| 5,651,054 A | 7/1997 | Dunn et al. |
| 5,668,852 A | 9/1997 | Holmes |
| 5,668,861 A | 9/1997 | Watts |
| 5,721,771 A | 2/1998 | Higuchi et al. |
| 5,751,795 A | 5/1998 | Hassler et al. |
| 5,774,067 A | 6/1998 | Olnowich et al. |
| 5,796,816 A | 8/1998 | Utsumi |
| 5,805,587 A | 9/1998 | Norris et al. |
| 5,809,128 A | 9/1998 | McMullin |
| 5,812,551 A | 9/1998 | Tsukazoe et al. |
| 5,825,867 A | 10/1998 | Epler et al. |
| 5,832,060 A | 11/1998 | Corlett et al. |
| 5,835,573 A | 11/1998 | Dee et al. |
| 5,894,504 A | 4/1999 | Alfred et al. |
| 5,920,623 A | 7/1999 | Bensman et al. |
| 5,946,386 A | 8/1999 | Rogers et al. |
| 5,960,064 A | 9/1999 | Foladare et al. |
| 5,960,073 A | 9/1999 | Kikinis et al. |
| 5,963,629 A | 10/1999 | Jung |
| 5,995,594 A | 11/1999 | Shaffer et al. |
| 5,995,603 A | 11/1999 | Anderson |
| 6,014,436 A | 1/2000 | Florence et al. |
| 6,031,896 A | 2/2000 | Gardell et al. |
| 6,032,051 A | 2/2000 | Hall et al. |
| 6,034,956 A | 3/2000 | Olnowich et al. |
| 6,035,031 A | 3/2000 | Silverman |
| 6,044,059 A | 3/2000 | Olnowich |
| 6,078,581 A | 6/2000 | Shtivelman et al. |
| 6,104,800 A | 8/2000 | Benson |
| 6,144,644 A | 11/2000 | Bajzath et al. |
| 6,160,881 A | 12/2000 | Beyda et al. |
| 6,167,127 A | 12/2000 | Smith et al. |
| 6,169,795 B1 | 1/2001 | Dunn et al. |
| 6,169,796 B1 | 1/2001 | Bauer et al. |
| 6,178,183 B1 | 1/2001 | Buskirk, Jr. |
| 6,181,691 B1 | 1/2001 | Markgraf et al. |
| 6,208,638 B1 | 3/2001 | Rieley et al. |
| 6,212,261 B1 | 4/2001 | Meubus et al. |
| 6,230,009 B1 | 5/2001 | Holmes et al. |
| 6,243,378 B1 | 6/2001 | Olnowich |
| 6,253,249 B1 | 6/2001 | Belzile |
| 6,278,704 B1 | 8/2001 | Creamer et al. |
| 6,282,276 B1 | 8/2001 | Felger |
| 6,304,565 B1 | 10/2001 | Ramamurthy |
| 6,310,939 B1 | 10/2001 | Varney |
| 6,321,194 B1 | 11/2001 | Berestesky |
| 6,330,317 B1 | 12/2001 | Garfinkel |
| 6,345,090 B1 | 2/2002 | Walker et al. |
| 6,350,066 B1 | 2/2002 | Bobo, II |
| 6,353,660 B1 | 3/2002 | Stevens et al. |
| 6,353,663 B1 | 3/2002 | Stevens et al. |
| 6,363,414 B1 | 3/2002 | Nicholls et al. |
| 6,405,035 B1 | 6/2002 | Singh |
| 6,411,601 B1 | 6/2002 | Shaffer et al. |
| 6,441,805 B1 | 6/2002 | Becker et al. |
| 6,430,274 B1 | 8/2002 | Winstead et al. |
| 6,438,216 B1 | 8/2002 | Aktas |
| 6,438,222 B1 | 8/2002 | Burg |
| 6,477,246 B1 | 11/2002 | Dolan et al. |
| 6,496,569 B2 | 12/2002 | Pelletier et al. |
| 6,496,576 B2 | 12/2002 | Tanaka et al. |
| 6,501,750 B1 | 12/2002 | Shaffer et al. |
| 6,505,163 B1 | 1/2003 | Zhang et al. |
| 6,510,162 B1 | 1/2003 | Fijolek et al. |
| 6,510,417 B1 | 1/2003 | Woods et al. |
| 6,512,930 B2 | 1/2003 | Sandegren |
| 6,519,258 B1 | 2/2003 | Tsukazoe et al. |
| 6,519,335 B1 | 2/2003 | Bushnell |
| 6,539,084 B1 | 3/2003 | Long |
| 6,546,087 B2 | 4/2003 | Shaffer et al. |
| 6,549,612 B2 | 4/2003 | Gifford et al. |
| 6,553,222 B1 | 4/2003 | Weiss |
| 6,564,264 B1 | 5/2003 | Creswell et al. |
| 6,564,321 B2 | 5/2003 | Bobo, II |
| 6,567,505 B1 | 5/2003 | Omori et al. |
| 6,574,319 B2 | 6/2003 | Latter et al. |
| 6,621,892 B1 | 9/2003 | Banister et al. |
| 6,636,590 B1 | 10/2003 | Jacob et al. |
| 6,643,034 B1 | 11/2003 | Gordon et al. |
| 6,662,232 B1 | 12/2003 | Nicholls et al. |
| 6,687,362 B1 | 2/2004 | Lindquist et al. |
| 6,690,785 B1 | 2/2004 | Stelter et al. |
| 6,738,461 B2 | 5/2004 | Trandal et al. |
| 6,751,299 B1 | 6/2004 | Brown et al. |
| 6,775,370 B2 | 8/2004 | Burg |
| 6,782,088 B1 | 8/2004 | Gabara |
| 6,785,021 B1 | 8/2004 | Gordon et al. |
| 6,792,082 B1 | 9/2004 | Levine |
| 6,792,094 B1 | 9/2004 | Kirkpatrick |
| 6,857,074 B2 | 2/2005 | Bobo, II |
| 6,879,677 B2 | 4/2005 | Trandal et al. |
| 6,898,275 B2 | 5/2005 | Dolan et al. |
| 6,968,174 B1 | 11/2005 | Trandal et al. |
| 7,003,087 B2 | 2/2006 | Spencer et al. |
| 7,103,167 B2 | 9/2006 | Brahm et al. |
| 7,289,612 B2 * | 10/2007 | Lurie et al. ............ 379/114.1 |
| 2002/0010616 A1 | 1/2002 | Itzhaki |
| 2002/0097710 A1 | 7/2002 | Burg |
| 2002/0176558 A1 | 11/2002 | Tate et al. |
| 2003/0039339 A1 | 2/2003 | Luehrig et al. |
| 2003/0156700 A1 | 8/2003 | Brown et al. |
| 2004/0028203 A1 | 2/2004 | Wurster et al. |
| 2004/0190706 A1 | 9/2004 | Fleisher, III et al. |
| 2004/0258220 A1 | 12/2004 | Levine et al. |
| 2005/0053216 A1 | 3/2005 | Spencer et al. |
| 2005/0123118 A1 | 6/2005 | Terry et al. |
| 2005/0207556 A1 | 9/2005 | Gonzalez et al. |
| 2006/0013374 A1 | 1/2006 | Fleisher, III et al |

FOREIGN PATENT DOCUMENTS

| | | |
|---|---|---|
| EP | 1120954 | 8/2001 |
| WO | WO 00 60840 | 10/2000 |
| WO | WO 01/76210 | 10/2001 |

OTHER PUBLICATIONS

Boorstein, J. "Listen to This-Free Long Distance", Direct Marketing Buisness Intelligence; http://www.directmag.com; Jul. 1, 1998; 2 pages.

* cited by examiner

CALL PROCESSING AND SUBSCRIBER REGISTRATION SYSTEMS AND METHODS

BACKGROUND OF THE INVENTION

1. Field of the Invention

The present invention relates to telecommunications, and in particular, to systems and processes for processing telephone calls and providing telephony services.

2. Description of the Related Art

Certain conventional telephone systems redirect incoming calls encountering a ring-no-answer, busy, or do-not-disturb condition, to a voice messaging system (VMS) on which the caller can record a message for the called party. When answering a call, certain conventional voice messaging systems play a tone, a system standard greeting or a called party's recorded greeting, followed by a record tone. The message of the caller is recorded. In some cases, a conventional VMS may offer the caller certain options related to leaving a message, such as the option of reviewing or deleting a message.

Generally, the call answering features provided by a conventional voice messaging system are often designed to facilitate the recording of a message for a called party or to transfer to a person who might be able to locate the called party.

SUMMARY OF THE INVENTION

The present invention relates to a telecommunication system that processes incoming phone calls and enables a caller to subscribe to call processing services.

In one embodiment, an incoming call intended for a subscriber is received by the call processing system. The incoming call may have been forwarded to the call processing system as a result of a forward-calls-on-busy (BCF), ring-no-answer (RNA), or do-not-disturb (DND) condition. In addition, the incoming call may have been received at the call processing system as a result of the caller dialing a phone number associated with the called party, but that when dialed, connects the caller to the call processing system without the need for a forwarding process. Optionally, if Caller-ID or other caller identification information is available, the call processing can record the Caller-ID or other caller identification information.

Upon receiving the incoming call, the call processing system can prompt the caller, via a tone or voice prompt to leave a message. For example, the prompt can be in the form of a system standard greeting or a greeting previously recorded by the called party. The called party may have selected which greeting is to be played to callers. The caller party then records a message on the call processing system which is stored in memory and/or optionally streamed to a phone or computer terminal associated with the called party. The call processing system can determine that the caller has completed leaving the message. For example, the call processing can detect when the called party has ceased speaking for a predetermined amount of time, and/or detect a caller key press that indicates the caller has completed leaving a message. Upon determining that the caller has completed leaving a message, in one embodiment, the call processing system prompts the caller to press a key or provide a voice command if the caller wishes to become, and register as a subscriber to the call answering service and/or other call processing services for themselves.

Optionally, if Caller-ID or other caller identification information was received with the call, the call processing system uses this information to determine if the caller is already a subscriber prior to providing the foregoing prompts. For example, the call processing system can search a subscriber database, file or other data store using the Caller-ID information or a portion thereof as a search key to determine if the caller is already a subscriber. Optionally, if the call processing system determines the caller is already a subscriber, the prompt asking if the caller wants to subscribe, and/or providing instructions regarding becoming a subscriber, are not provided.

Assuming the call processing has provided the prompt, and the caller has provided a corresponding key press and/or voice command, the caller key press or voice command initiates, by way of example, an Interactive Voice Response (IVR) session to collect the appropriate information from and/or for the caller so that customer care personnel or other agent can transcribe the information and fulfill the request for service. Optionally, in response to the caller key press or voice command, the call processing system can instead connect or forward the caller to a service center wherein service center personnel, such as a live agent, can request that the caller provide certain information, such as billing information, contact information, the caller's home phone number, work phone number, wireless/cell phone number, other phone numbers, home email address, work email address, other email addresses, and so on.

In addition, the personnel can provide the caller with a description of the available service offered by the call processing system and associated cost, if any, and record which of the services the caller wants. For example, the services can include call answering services, call screening services, and so on. The foregoing collected information can be entered in the fields of an appropriate electronic form, such as a registration form, displayed on a terminal screen, and stored in a subscriber or other database or data store. Optionally, if the caller's call included signaling information, such as Caller-ID information, that information can be used to automatically pre-populate certain subscriber record fields.

In another embodiment, the service provider may elect to optionally transfer the call to a live agent who will assist them in signing up for the service.

By way of example, in an embodiment, a method of processing a call at a call processing system comprises: receiving at a call processing system a first call from a caller, the first call intended for a user, the first call including associated signaling information; obtaining caller identification information from the signaling information; transmitting notification information to a computer associated with the user; establishing a 2-way talk path between the call processing system and the caller; playing a greeting to the caller; recording a voice message from the caller; determining when the caller has completed recording the voice message; determining if a first parameter related to the caller is met based at least in part on information retrieved from a data store using the caller identification information; based at least in part on the first parameter being met, playing a sales lead generation prompt; receiving an instruction from the caller provided at least partly in response to the sales lead generation prompt; based at least in part on the response: originating a second call to a call center; bridging the first call and the second call; receiving information from the caller at the call center; and establishing an account for the caller using at least a portion of the received information.

By way of further example, in an embodiment, a call processing system, comprompising: a first telephony interface configured to receive a call from a caller; a storage device configured to store a greeting; and a call answering system configured to: play the greeting in response to receiving the call; record a voice message from the caller; determine when the caller has completed recording the voice message; after determining that the caller has completed recording the voice message, and play a prompt regarding the caller becoming a subscriber to call services provided by the call processing system.

By way of another example, in an embodiment, a method of processing a call compromises: receiving at a call processing system a first call from a caller, the first call intended for a user; playing a prompt to the caller during the first call, the prompt asking the caller to take a first action if the caller wants to subscribe to at least a first call processing service; at least partly in response to the first action, requesting account information from the caller; recording the requested account information from the caller, wherein at least a portion of the account information is to be used to provide call processing services to the caller; and during the first call, recording a voice message from the caller for the called party.

By way of yet another example, in an embodiment, a method of processing a call comprises: receiving at a call processing system a first call from a caller, the first call intended for a user, the first call including associated signaling information; playing a greeting to the caller asking the caller if the caller wants to record a message for the user; determining if a first parameter related to the caller is met based at least in part on information retrieved from a data store using the caller identification information; based at least in part on the first parameter being met, playing a sales prompt; receiving an instruction from the caller provided at least partly in response to the sales prompt; at least partly in response to receiving the instruction, requesting information from the caller; and recording requested information from the caller.

DETAILED DESCRIPTION OF PREFERRED EMBODIMENTS

The present invention relates to a telecommunication system that processes incoming phone calls and enables a caller to subscribe to call processing services.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well. In addition, unless otherwise indicated, the functions described herein are preferably performed by executable code and instructions running on one or more general-purpose computers. However, the present invention can also be implemented using special purpose computers, state machines, and/or hardwired electronic circuits.

Figure 1:
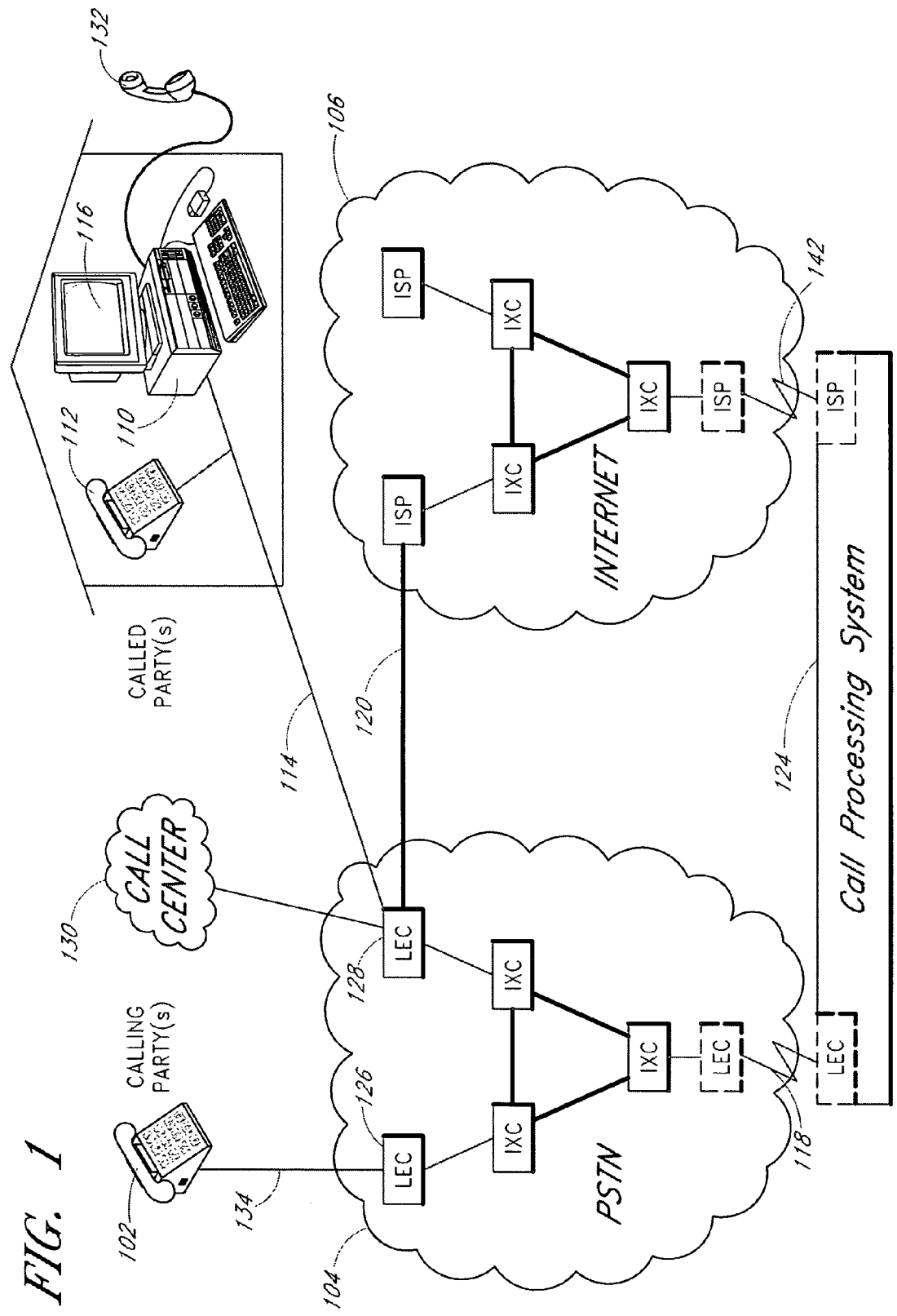
FIG. 1 illustrates an example telecommunications system that can be used in accordance with one embodiment of the present invention.

FIG. 1 illustrates an example telecommunications system that can be used in accordance with the present invention. As illustrated, the telecommunications system includes:
  a plurality of user telephone stations 102, 112.
  a plurality of user computer terminals 110.
  a call processing system 124 that acts as an Internet Call Answering (ICA) system.

These devices are linked together using various line and trunk circuits to a Public Switched Network (PSTN) 104 and to a common data network, such as the Internet 106.

Figure 2:
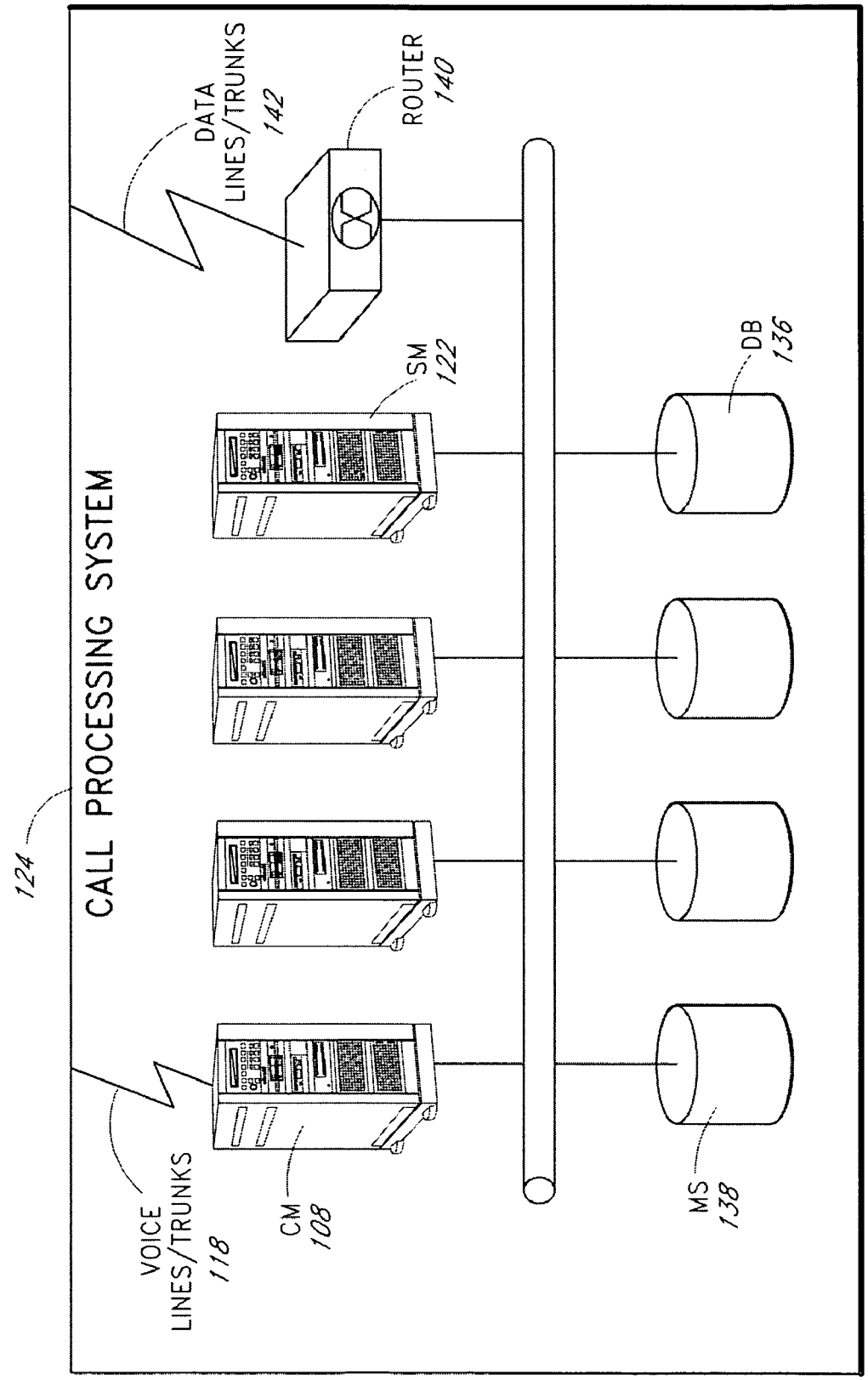
FIG. 2 further details subsystems that included in the call answering system depicted in FIG. 1 described above.

FIG. 2 further decomposes the ICA system 124 into its functional components:
  a Call Management (CM) subsystem 108, which serves as the interface to the PSTN 104 to manage inbound and outbound telephone calls.
  a Router subsystem 140, which serves as the interface to the Internet 106 to manage communications between online IP client devices and the various ICA servers.
  an online presence detection Internet Session Management (SM) subsystem 122, which monitors the status of subscriber data terminals to determine availability for call handling services.
  a shared Media Storage (MS) subsystem 138, which persistently archives the caller's voice messages and the called party/subscriber's personal greeting(s).
  an ICA Database (DB) subsystem 136 in which called party/subscriber ICA service parameters are stored.

The various subsystems are interconnected via a Local Area Network (LAN) and/or via a Wide Area Network (WAN). Other embodiments of the ICA system 124 are described in U.S. patent application Ser. No. 09/539,375, filed Mar. 31, 2000, now U.S. Pat. No. 6,477,246, the contents of which are incorporated herein in their entirety by reference.

CallWave, Inc. operates one such ICA system. As is well known in the field of Internet telecommunications, an ICA service works with the "Call Forward On Busy" feature of a standard phone line to answer calls while the subscriber is online and is using the phone line to access the Internet. Once activated, callers no longer get annoying busy signals when the subscriber is online. Instead, callers hear a brief greeting after which they can leave a short message. The recording can be streamed in substantially real-time or sent to the subscriber over the Internet within seconds after the recording has completed. As with a home telephone answering machine, the subscriber can elect to interact with the caller while they are still on the line or can call them back at a later time.

Referring back to FIG. 1, the user telephone stations 102, 112 are respectively connected to local exchange switches 126, 128 via telephone lines 134, 114. The stations 102, 112 can optionally be conventional POTS (Plain Old Telephone Service) telephones or local extensions behind a corporate Private Branch Exchange (PBX).

The telephone stations 102, 112 can be coupled to the same switch or different switches. If the telephone stations 102, 112 are coupled to the same switch, the switch will be local to both the calling and called parties, such as for intra-LATA or local calls. If telephone stations 102, 112 are coupled to different switches, each switch may be local only to one of the parties, as is the case for non-local calls such as inter-LATA (long-distance) calls.

In the illustrated embodiment, the CM subsystem 108 is coupled into the PSTN 104 through voice trunk circuits 118 directly interfacing with the Inter Exchange Carrier's (IXC) circuit switched or packet switched telephony network. Thus, advantageously the ICA system 124 does not have to be directly serviced by the same Local Exchange Carrier's (LEC) switch or PBX as the calling or called terminals 102 and 112. Indeed, the ICA system 124 or its individual subsystem components can be located in a different country than the called and calling parties. In this example, the ICA system 124 is locally attached to a LEC switch with a physical line or local trunk interface circuit. This switch may or may not be serving telephone stations 102 and/or 112.

Optionally, the CM subsystem 108 is coupled into the PSTN 104 through an IP connection. A gateway within the PSTN 104 answers inbound calls, packetizes voice data, and delivers the call to the CM subsystem 108 as a VoIP stream. Signaling information is provided in a SIP/H.323 format or other appropriate format at the CM subsystem 108. An example VoIP network is that provided by Level 3 Corporation, although there are many other sources and implementations of VoIP networks.

The ICA voice trunk circuits 118 are not limited to a particular signaling convention. For example, the present invention can be utilized with a Common Channel Signaling system, such as Signaling System 7 (SS7), having separate voice/user data and signaling channels. In addition, the present invention can be used with other signaling methods, such as the following trunk-side signaling interfaces: ISDN-PRI; Advanced Intelligent Network; and/or Service Node architectures. Preferably, the selected signaling system provides a suite of call presentation information to the ICA system 124, including one or more of:

ANI—Automatic Number Identification: phone number and privacy indicator of the calling party ("Caller-ID").

DNIS—Dialed Number Identification: phone number of the ICA system's voice trunks 118 that the call was forwarded to.

OCN—Original Called Number Identification: phone number of the original called party (subscriber to the ICA service).

Call Type—Forwarded call due to a BCF, RNA, or DND/CFA condition. In addition, directly dialed inbound calls can be handled as well. In this instance, the caller will need to implement a second stage of dialing to enter the subscriber's phone number or the subscriber could be assigned a unique personal number that is directly dialed by their callers (sometime referred to herein as a "personal number").

The telephone lines 134, 114 may be shared with one or more computer terminals. For example, telephone terminal 112 shares the telephone line 114 with a computer terminal 110. While in the illustrated example the computer terminal 110 is a personal computer, the computer terminal 110 can be an interactive television, a networked-enabled personal digital assistant (PDA), other IP (Internet Protocol) device, or the like. Alternatively, the computer terminal 110 can be a personal computer having a monitor, keyboard, a mouse, a disk drive, sound card or similar sound reproduction circuitry such as a codec, streaming media playback software, such as the Media Player program available from Microsoft, speakers, and a modem, such as a standard V.90 56K dial-up modem. The modem can optionally be configured to dial-up a number under control of an application, such as a contact manager application or telecommunications client application phone dialer, stored and executing on the computer terminal 110.

The telephone line 114, can be used to establish a dial-up connection for computer terminals, such as terminal 110 via the computer modem, to an Internet Service Provider (ISP) offering dial-in remote access service connections from the PSTN 104 via trunk interface circuits 120. The computer terminal 110 can also be connected to the Internet 106 via a broadband connection, such as a DSL line, a television cable line, or a T1 line.

In addition, the computer terminal 110 can be equipped with a Voice over Internet Protocol (VoIP) software module and a headset or a handset 132, including a microphone and speaker, allowing voice communications to be conducted over a computer network, such as the Internet 106. VoIP communicates information via packet switching, which opens a connection just long enough to send a small packet of data. Each packet includes a destination address informing the network where to send the packet along with the actual voice data payload. If the receiving station is also a VoIP terminal, then when the receiving terminal receives the packets, VoIP software executing on the receiving terminal reassembles the packets into the original data stream. The data stream is then converted to a voice signal. If the receiving station is a conventional telephone, then a VoIP gateway converts the packets into a voice signal that is then connected to the PSTN 104.

In one embodiment, the VoIP process is performed using the H.323 standardized protocol established by the International Telecommunications Union (ITU). Advantageously, H.323 provides specifications for real-time, interactive videoconferencing, data sharing and audio applications such as IP telephony. Alternatively, the Session Initiation Protocol (SIP), established by the Internet Engineering Task Force (IETF), can be used. SIP is generally more efficient than the H.323 protocol as SIP is specifically intended for IP telephony. For example, as similarly described above, the processing system CM subsystem 108 is coupled into the PSTN 104 through an IP connection. A gateway within the PSTN 104 answers inbound calls, packetizes voice data, and delivers the call to the CM subsystem 108 as a VoIP stream. Signaling information is optionally provided in a SIP/H.323 format or other appropriate format. Alternatively, proprietary protocols can optionally be deployed where multi-vendor interoperability is not required.

Optionally residing and executing on the computer terminal 110 is a communications management Client application 116. The Client application 116 is used to provide enhanced communication services, as discussed in greater detail below. The Client application 116 is connected to and communicates with the ICA system 124 via the Internet 106, other public wide area computer networks, or the like.

The ICA system 124 optionally hosts a Web site used by subscribers of the ICA service to setup and manage their accounts, to view information about incoming calls, and to instruct the ICA system 124 on how to route incoming calls to one or more destination stations. Many of these same functions can be implemented by the Client application 116 as well. The ICA system 124 optionally includes an email client used to receive and transmit communications to users, call centers, and so on.

The CM subsystem 108 manages communications with the Client application 116 and with forwarded calls. The CM subsystem 108 can interact with callers and called parties through voice prompts, voice commands, and/or DTMF touch-tone entries. The CM subsystem 108 is optionally configured to perform additional functions, such as acting as a telephone answering system that answers calls, playing outgoing greetings and announcements, recording incoming messages, and bridging calls. In addition, as will be described in greater detail below, the CM subsystem 108 further provides a call screening process.

The SM subsystem 122 monitors the Internet for online IP devices registered to ICA subscribers to determine their availability for handling inbound call screening and call handling services. When a user or subscriber connects to the Internet using, for example, a dial-up ISP, the Client application 116 executing on the subscriber's computer terminal 110 makes the subscriber's online presence known to the ICA system 124. Presence detection can be performed by the SM subsystem 122 polling or pinging the computer terminal 110 via the telecommunications Client application 116, or by the telecommunications Client application 116 transmitting a "Login/I'm alive" message and subsequent periodic "keep alive" messages to the SM subsystem 122. Just prior to the normal termination of the online Internet session, the Client application 116 sends a "Logout" message to the SM subsystem 122. Abnormal Internet session termination conditions are detected by the SM subsystem 122 timing out the expected Client "Keep alive" message.

If, rather than using a dial-up connection, the user or subscriber is using a broadband, always on-connection, such as via a DSL line or cable modem, the Client application 116 optionally becomes active when the computer 110 is turned on or powered up and stays on until the user manually shuts down the Client application 116, or the computer 110 is turned off or powered down.

With reference to FIG. 1, the called party's station 102 has been configured with the local switching system 128 to forward calls on busy (BCF), ring-no-answer (RNA), or do-not-disturb (DND) to the voice trunk circuits 118 connecting the CM subsystem 108 to the PSTN 104. The calling party initiates a call using the calling party telephone station 102 by dialing the number of a called party's phone line 114. The PSTN 104 routes this call to the called party's local switching system 128 causing the called party's telephone terminal 112 to ring or to forward the call immediately if the line 114 is busy or set to do-not-disturb. If, for example, the called party does not answer within a certain amount of time or after a certain amount of rings, the associated switching system 128 detects a no-answer condition and invokes a switch operation command termed "call forwarding on RNA". The call is then forwarded to a phone number of the CM subsystem 108.

Based at least in part on the OCN of the forwarded call (the original called party's phone number), the CM subsystem 108 queries the SM subsystem 122 to determine whether the called party is a registered subscriber, is online or offline, and what the subscriber's call handling preferences are. If the called party's computer 110 is online, the CM subsystem 108 optionally opens a communication channel over the public Internet 106 to the Client application 116 running on the called party's computer terminal 110. The Caller-ID of the calling party, if available, and if not designated as private, is optionally transmitted to the Client application 116 and is displayed to the subscriber along with an optional sound notification. The sound notification can be in the form of ringing produced using the called party's computer terminal 110 speakers.

The CM subsystem 108 proceeds to play a greeting to the calling party. The greeting can be a "canned" greeting or a personalized greeting previously recorded by the subscriber and stored in the MS subsystem 138. The initial or subsequent greeting or prompt optionally includes a voice prompt inviting the caller to register for the service the subscriber is using or a similar service.

One or more of the parameters discussed below enable the call processing system operator or service provider to control or throttle the number of potential requests on a system-wide or subscriber specific basis. This can be used to manage the number of requests if the service provider has a limited staff of live agents. For example, if there are not enough call center agents available, the playing of sales-related prompts can be disabled. In addition, there may be a class of service in which it is inappropriate to generate sales leads using this method, such as when the called party has a premium business class of service, or when a subscriber has requested that caller's to the subscriber not be solicited to become or register as subscribers. In addition, the playing of solicitation prompts can be limited to certain periods of time, such during normal working hours, or in the evening, and/or to certain days, such as only on Monday-Friday, or only on Sunday and/or Saturday.

A service provider may also want to manage the number of impressions to a given caller based on caller ID. For example, if a caller has received a predetermined number of promotion events or prompts, optionally the caller will not be provided with additional promotion events or prompts for at least a predetermined amount of time. In an example embodiment, the call processing system can keep a record in a database or other data store of the number of times a given solicitation prompt, such as a promotion prompt or trailer, has been played to a caller. Optionally, when a call is received by the call processing system, the call processing system obtains the Caller-ID or similar information, access the database, retrieves the number of times a promotional prompt or trailer has been played to the phone number that matches the Caller-ID, and compares the number of play events with a predetermined number, and based on that comparison, determines if the promotional prompts are to be played again.

By way of illustration, if a caller associated with the phone number 805-123-4567 has already heard the promotion or solicitation a predetermined number of times, such as 3 times, the call processing system can suppress future promotions of the service to the caller, or change the promotion type. For example a promotion for a different service can be provided, or a special discount can be provided, or the same promotion can be offered using different prompts or text.

Optionally, lead generation prompting can also be selectively suppressed based on queries into a subscriber's address book, wherein the address book can be stored on the call processing system and/or the subscriber's contact database or other data store stored on the subscriber's personal computer or other personal device. For example, if a subscriber has entered or assigned an appropriate designation, such as a VIP designation, in association with a person and/or their phone number, then if a call is received from that person (as may be determined by the call processing system by querying the subscriber's contact database using the Caller-ID associated with the call), the lead generation prompting will be suppressed.

Still further, the service provider can optionally suppress the lead generation or promotion prompting based on the type of call, such the call being forwarded to the call processing system as a result of a busy forward condition, a ring-no-answer forward condition, a do-not-disturb forward condition, and/or the call be placed directly (wherein the call was not forwarded) to the call processing system.

By way of example, if a system-wide and subscriber-level configuration parameter is enabled, a "canned" or prerecorded lead generation greeting invites the caller to press the "#" key (or other designated key) when they are finished leaving a message. After the caller leaves a message and presses the "#" key (or optionally stops speaking for a predetermined amount of time), the CM subsystem 108 plays a voice prompt promoting the service and inviting the caller to press a key or provide a verbal response in order to receive more information regarding subscribing to the service via the phone call, or requests that the call access a web site to receive more information and/or to subscribe.

The following is an example prompt, although other text can be used as well: "Thank you. Your message is being played now (or will be played) by your party. If you would like to learn more about getting important call answering services, press 1 now or visit www.callwave.com." If the caller selects the more information option (by pressing key 1 in this example), the CM subsystem 108 plays a voice prompt requesting the caller leave contact information. For example, the prompt can recite: "Now's your chance to try CallWave risk-free . . . . After the tone, please say AND spell your email address." After the CM subsystem 108 records the caller's contact information the CM subsystem 108 plays a closing voice prompt. For example, the prompt can recite: "A confirmation email will be sent to you shortly. Thanks for your interest in CallWave."

The CM subsystem 108 optionally sends the recorded contact information as an email with a voice file attachment to a customer care representative connected to the local area network 137 or through the data lines 142, to the Internet, to a customer care representative off-site. The recorded contact information and/or voice mail can be transmitted using other techniques as well. Support or other personnel transcribes the contact information, combines or associates the contact information with the caller's phone number (obtained from the caller ID signaling information or otherwise), and transcribes this information into a paper or electronic form that can be used by other personnel to place a return call and/or send an HTML email to the caller to complete the sign-on process.

Optionally, rather than having the caller record their contact information for later follow-up, the caller can be placed in contact with a live operator in response to the caller pressing the "1" key (or other designated key). For example, after the caller leaves a message and requests additional information, the CM subsystem 108 plays a voice prompt informing the caller that the call is being transferred to an operator. For example, the prompt can recite "Thank you for your interest in our services, your call is being transferred to an operator." Optionally, substantially simultaneously, the CM subsystem 108 originates a new call to a Call Center 130 via the telephone trunks 118. When the Call Center 130 answers, the CM subsystem 108 bridges the inbound call to the outbound call.

In an example embodiment, if the subscriber had recorded a personalized greeting, the CM subsystem 108 optionally plays a voice prompt after the greeting and before the record tone instructing the caller to enter a key press to "send" the message (e.g. prompt, "Begin recording after the tone, press # when you are finished.").

In another example, the Call Processing System 124 is optionally closely integrated with the Call Center telephone/Automatic Call Distribution system. Before a call is routed from the call processing system one or more pre-routing checks are optionally performed. If a check fails, the caller is optionally defaulted into an IVR treatment, wherein the caller will provide information to an automated system rather than a live operator. Pre-routing checks can include one or more of the following, wherein if a check fails, the call will be handled by an automated system:

Was the call received during the Call Center hours of operation;

Does the number of calls in a Call Center queue exceed a threshold;

does the average call holding time exceed a given threshold?

Furthermore, the CM system 108 can pass Calling Party ID (Caller-ID signaling information) and Caller Name signaling information associated with the call to the Automatic Call Distribution system. The Automatic Call Distribution system can then display the name of the caller to the agent answering the call via a computer terminal associated with the agent. This information can be used by an agent to greet the caller and to pre-populate service registration screens. Additionally, because some call answering services optionally require verification and authorization to configure additional services on a subscriber's existing phone line, the network-based caller ID information can be used to perform this billing authorization task.

Optionally, the call processing system interface to the PSTN allows the inbound call to be forwarded rather than bridged through the Call Manager subsystem 108. In this case, in response to a caller action for additional information, the Call Manager subsystem 108 signals the network to forward the call to the Call Center. Similarly, when VoIP is being used, the Call Manager system 108 signals the SIP/VoIP network to forward the call to the Call Center.

Several of the examples described above refer to calls forwarded from a called party's line to the call processing system. However, a call need not be forwarded in order to be received and processed by the call processing system. For example, a personal phone number can be uniquely assigned to a given subscriber by which calls to that number, if not answered by the caller as a result of a "take the call" command by the called party, can result in a caller message being recorded (and optionally screened), after which the call processing system can provide the promotional prompt or trailer prompts as similarly described above. The personal number can be, for example a telephone number that has been acquired through governmental telephone number administration bodies, provisioned in the PSTN network, assigned to the ICA system and registered to an individual subscriber.

Figure 3:
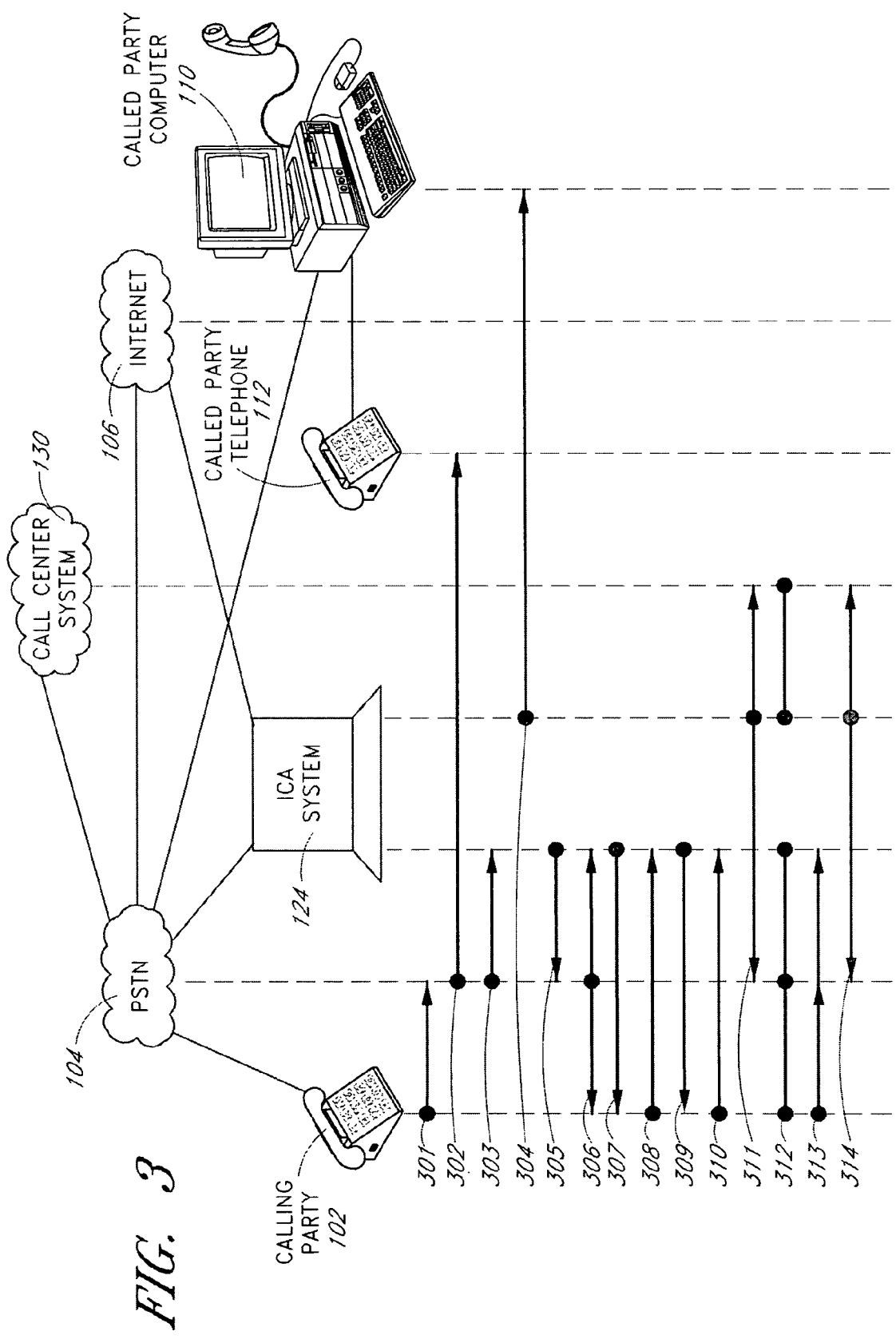
FIG. 3 illustrates a first example trailer lead generation process.

FIG. 3 illustrates an example call flow diagram, including an abstraction of the previously described telecommunications system. For clarity, the detailed breakout of the network elements and individual subsystems of the ICA system 124 illustrated in FIGS. 1 and 2 are not shown in FIG. 3. Not all the states need to be reached, nor does the call flow have to be performed in the illustrated order. In this example, the calling party is associated with telephone terminal 102 and the called party is associated with terminal 112. In this embodiment, the called party is subscribed to an Internet call answering service that forwards calls to the remote ICA system 124 upon the occurrence of selected conditions, wherein the ICA system 124 transmits a notification to the called party regarding the call and provides promotional prompts to the caller.

At state 301, a Calling Party, using terminal 102, originates a call to Called Party Phone Line 114. At state 302, the Called Party LEC switch 128 detects that the Called Party Telephone Line 114 busy (or the occurrence of a ring-no-answer (RNA), or do-not-disturb (DND) condition). At state 303, the Called Party LEC switch 128 forwards the call to the ICA Line/Trunk. At state 304, the ICA system 124 optionally notifies the online computer 110 associated with the Called Party of the incoming call. For example, the notification can be provide via the Internet 104 to the client application executing on the computer 110. At state 305, the ICA system 124 answers the incoming call from the Calling Party and optionally receives and stores the Caller ID information, including the caller phone number, and optionally the caller name. At state 306, the PSTN 104 establishes a two-way talk path between the ICA system 124 and the Calling Party phone terminal 102.

At state 307, the ICA system 124 plays a greeting to the Calling Party via the telephone station 102 and asks the Calling Party to leave a message. At state 308, the Calling Party, via telephone station 102, records a voice message, which is optionally streamed to a called party computer and/or phone terminal so that the Called Party can screen the call. The ICA system 124 determines when the Calling Party has completed leaving the message. For example, if the Calling Party ceases speaking for a predetermined amount of time, such as 2, 3, 4, or 5 seconds, the system 124 may determine the Calling Party has concluded leaving the message. In addition, if the Calling Party presses a message termination key, such as the # key, the system 124 can conclude the Caller Party has concluded leaving the message.

At state 309, the ICA system 124 plays a solicitation prompt, such as a sales lead generation trailer and/or related prompts. For example, the prompt can instruct the Calling Party to press a specified key or provide a voice response in order to speak to a live operator in order to register and become a subscriber of the services offered by the ICA system 124. Optionally, before playing the sales lead generation trailer and/or related prompts, a determination can be made as to the status of certain parameters, such as the number of times the trailer has been previously played to the Calling Party, whether the called party's address book has a special designation stored in association with the caller's name, whether the Calling Party is already a registered subscriber of the ICA system services, whether such prompts are to be played at the time and/or day of the call, and/or the type of call. If the caller hangs-up or otherwise terminates the call before state 309 is reached, the processes is optionally terminated without a sales lead generation trailer and/or related prompts being played.

At state 310, in this example the Calling Party 102 selects the option to speak with a live agent by pressing an appropriate key or otherwise providing an appropriate command. At state 311, the ICA system 124 originates a new call to the Call Center 130. Optionally, the ICA system 124 can insert the Calling Party's phone number into the ANI field of the new call so that the Calling Party's phone number and/or name can be automatically presented to a Call Center agent via a caller identification display, which can be a computer terminal, a dedicated Caller ID display, or other display at state 312. By way of example, the Calling Party's phone number may have been obtained from the signaling information associated with the original call placed via the terminal 102.

At state 312, the ICA system 124 bridges the Calling Party's telephone station 102 to the Call Center 130. At state 313, the Calling Party provides the requested information, such as one or more of the following: billing information, contact information, home phone number, work phone number, wireless/cell phone number, other phone numbers, home email address, work email address, other email addresses, and so on until the Calling Party finishes providing the requested information. The agent can enter the information via an electronic form or otherwise, which then can be recorded in an appropriate database or other data store. A portion of the form can optionally be automatically populated using caller identification information, such as Caller ID information, provided by or retrieved using the caller's call signaling information. The Caller Party then terminates the call by hanging up the telephone station 102. At state 314, the ICA system 124 releases bridging resources and signals call completion to the Call Center 130.

Figure 4:
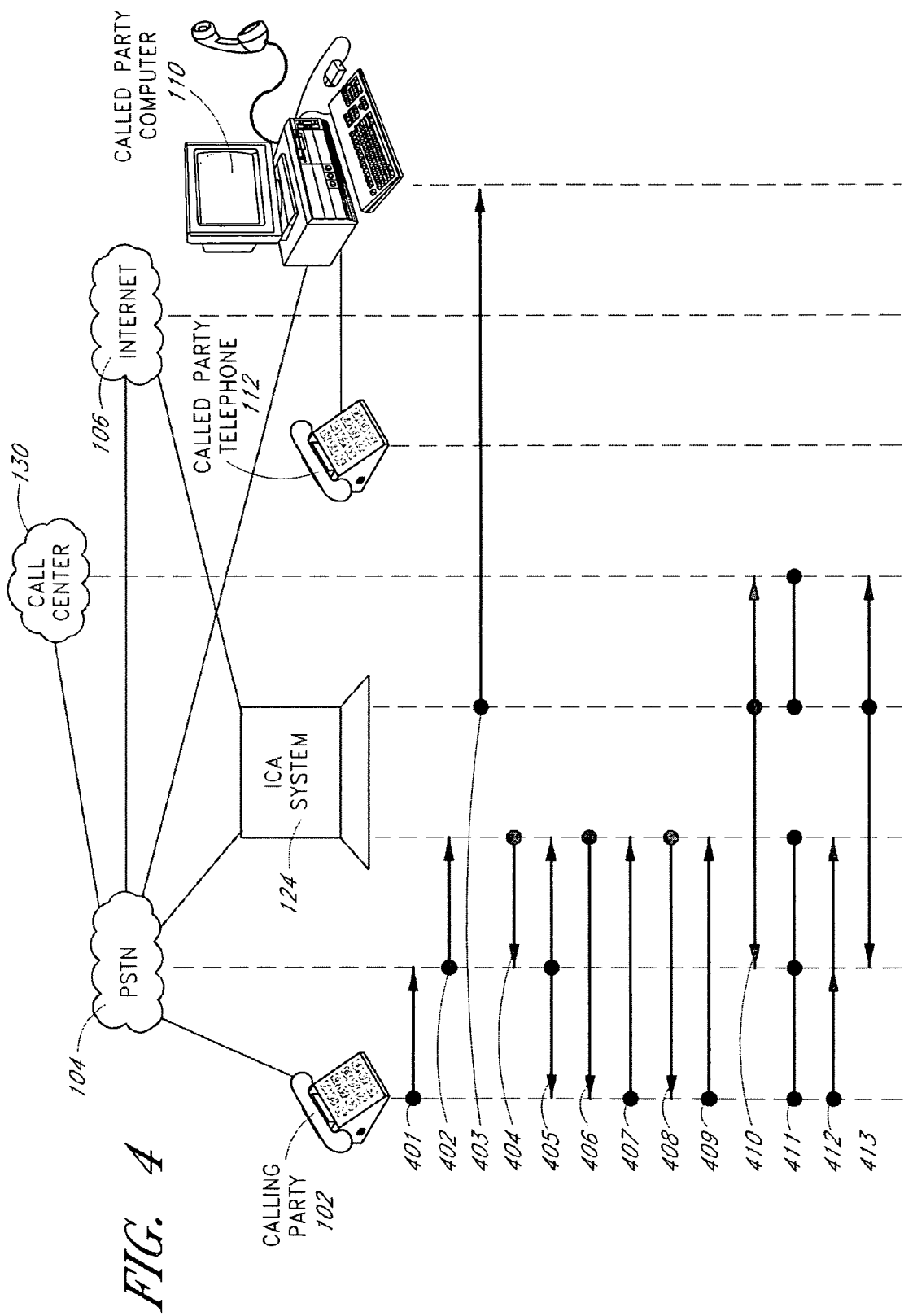
FIG. 4 illustrates a second example trailer lead generation process.

FIG. 4 illustrates an example call flow diagram for a call initially placed directly to a called party's call processing system personal number, including an abstraction of the previously described telecommunications system. For clarity, the detailed breakout of the network elements and individual subsystems of the ICA system 124 illustrated in FIGS. 1 and 2 are not shown in FIG. 4. Not all the states need to be reached, nor does the call flow have to be performed in the illustrated order.

As will be described, in this example, the initial call is not forwarded to the ICA system 124, but is placed directly to the ICA system 124 via the called party's personal number. In this example, the calling party is associated with telephone terminal 102, as well as a personal number, wherein calls placed to the personal number are directed to the call processing or ICA system 124, without a call forwarding process. The called party is associated with terminal 112.

At state 401, a Calling Party, using terminal 102, originates a call to the Called Party's personal number and at state 402 the call is connected via the ICA Line/Trunk to the ICA system 124. At state 403, the ICA system 124 optionally notifies the online computer 110 associated with the Called Party of the incoming call, including a caller identifier, such as the caller ID of the caller. For example, the notification can be provided via the Internet 104 to the client application executing on the computer 110. At state 404, the ICA system 124 answers the incoming call from Calling Party. At state 405, the PSTN 104 establishes a two-way talk path between the ICA system 124 and the Calling Party phone terminal 102.

At state 406, the ICA system 124 plays a greeting to the Calling Party via the telephone station 102 and asks the Calling Party to leave a message. At state 407, the Calling Party, via telephone station 102, records a voice message, which is optionally streamed to a called party computer and/or phone terminal so that the Called Party can screen the call. The ICA system 124 determines when the Calling Party has completed leaving the message. For example, if the Calling Party ceases speaking for a predetermined amount of time, such as 2, 3, 4, or 5 seconds, the system 124 may determine the Calling Party has concluded leaving the message. In addition, if the Calling Party presses a message termination key, such as the # key, the system 124 can conclude the Caller Party has concluded leaving the message.

At state 408, the ICA system 124 plays a solicitation prompt, such as a sales lead generation trailer and/or related prompts. For example, the prompt can instruct the Calling Party to press a specified key or provide a voice response in order to speak to a live operator in order to register and become a subscriber of the services offered by the ICA system 124. Optionally, before playing the sales lead generation trailer and/or related prompts, a determination can be made as to the status of certain parameters, such as the number of times the trailer has been previously played to the Calling Party, whether the called party's address book has a special designation stored in association with the caller's name, whether the Calling Party is already a registered subscriber of the ICA system services, and/or the type of call. If the caller hangs-up or otherwise terminates the call before state 408 is reached, the process is optionally terminated without a sales lead generation trailer and/or related prompts being played.

At state 409, in this example the Calling Party 102 selects the option to speak with a live agent by pressing an appropriate key or otherwise providing an appropriate command. At state 410, the ICA system 124 originates a new call to the Call Center 130. As similarly discussed with respect to FIG. 3, optionally, the ICA system 124 can insert the Calling Party's phone number into the ANI field of the new call so that the Calling Party's phone number and/or name can be automatically presented to a call center agent via a caller identification display, which can be a computer terminal, a dedicated Caller ID display, or other display at state 411.

At state 411, the ICA system 124 bridges the Calling Party's telephone station 102 to the Call Center 130. At state 412, the Calling Party provides the requested information, such as one or more of the following: billing information, contact information, home phone number, work phone number, wireless/cell phone number, other phone numbers, home email address, work email address, other email addresses, and so on until the Calling Party finishes providing the requested information. The agent can enter the information via an electronic form or otherwise, which then can be recorded in an appropriate database or other data store. A portion of the form can optionally be automatically populated using caller identification information, such as Caller ID information, provided by or retrieved using the caller's call signaling information. The Caller Party then terminates the call by hanging up the telephone station 102. At state 413, the ICA system 124 releases bridging resources and signals call completion to the Call Center 130.

In another example, the initial greeting optionally provides prompts related to leaving a message for the called party and/or to inviting the caller to register for the service the subscriber is using or a similar service. Thus, a registration or subscription solicitation prompt can optionally be played before recording a message from the caller. By way of example, the caller can first record a message for the called party and subsequently perform the registration process, or after first performing or completing the registration process, the caller can then be prompted via another greeting to leave a message, and the caller ['s] message for the called party can then be recorded. Optionally, at any point (including during the playing of a greeting or recording of a message), or at selected points during a call session, the caller can press an appropriate key, such as the "#" key, and transition to the registration process.

For example, a caller can originate a call to a phone number associated with a called party. The call is directed to the ICA system 124. A two-way talk path is established between the ICA system 124 and the Calling Party phone terminal 102. The ICA system 124 plays a prompt to the calling party via the telephone station 102. The prompt can include a solicitation prompt as well as a prompt regarding leaving a message for the called party. For example, the prompt can instruct the caller to press the "#" key (and/or wait for a record message tone) in order to leave a message for the called party. After leaving a message and/or in response to the caller pressing an appropriate key, such as the "#" key, the ICA system can then prompt the caller to register for call processing services or other services provided by the ICA system 124, or other like system. By way of further example, the prompt can instruct the calling party to press a specified key or provide a voice response in order to speak to a live operator so as to register and become a subscriber of the services offered by the ICA system 124.

Optionally, before playing the solicitation prompt, a determination can be made as to the status of certain parameters, such as the number of times the trailer has been previously played to the calling party, whether the called party's address book has a special designation stored in association with the caller's name, whether the calling party is already a registered subscriber of the ICA system services, whether the solicitation prompt is enabled for the day and/or time of the call, and/or the type of call.

If the calling party selects the option to speak with a live agent by pressing an appropriate key or otherwise providing an appropriate command, the ICA system 124 originates a new call to the Call Center 130 and bridges the calling party's call to the Call Center 130. Optionally, the ICA system 124 can insert the calling party's phone number into the ANI field of the new call so that the calling party's phone number and/or name can be automatically presented to a call center agent via a caller identification display, which can be a computer terminal, a dedicated Caller ID display, or other display.

The call center agent can request certain user information, and the calling party can provide such information. The information can include one or more of the following: billing information, contact information, home phone number, work phone number, wireless/cell phone number, other phone numbers, home email address, work email address, other email addresses, and so on. The agent can enter the information via an electronic form or otherwise, which the can be recorded in an appropriate database or other data store. After the information is provided, the caller can be prompted to leave a message for the called party.

Thus, as described above, embodiments of the present invention provide a flexible, customer acquisition service that can be advantageously used by service providers to promote their online or offline call answering service. Certain embodiments advantageously enable the caller to subscribe to the service while experiencing the service first hand, but optionally after the caller has completed a communication with or for the called party, such as by leaving a message for the called party. Further, in the same call session, a caller can optionally record a message for a system service subscriber, and become a system service subscriber herself.

It should be understood that certain variations and modifications of this invention would suggest themselves to one of ordinary skill in the art. In particular, the promotion of other enhanced services such as call screening and discounted long distance should not be excluded. The scope of the present invention is not to be limited by the illustrations or the foregoing description thereof.

What is claimed is:

1. A method of processing a call at a call processing system, the method compromising:

receiving at a call processing system a first call from a caller, the first call intended for a user, the first call including associated signaling information;

obtaining caller identification information from the signaling information;

transmitting notification information to a computer associated with the user;

establishing a 2-way talk path between the call processing system and the caller;

playing a greeting to the caller;

recording a voice message from the caller;

determining when the caller has completed recording the voice message;

determining if a first parameter related to the caller is met based at least in part on information retrieved from a data store using the caller identification information, wherein the first parameter is related to:

whether a first prompt has been previously played with respect to a previous call associated with the caller identification information;

a designation previously provided by the user with respect to the caller; and/or whether the caller identification information is associated with a call processing system subscriber;

based at least in part on the first parameter being met, playing a sales lead generation prompt;
receiving an instruction from the caller provided at least partly in response to the sales lead generation prompt;
based at least in part on the response,
originating a second call to a call center;
bridging the first call and the second call;
receiving information from the caller at the call center; and
establishing an account for the caller using at least a portion of the received information.

2. The method as defined in claim 1, wherein the first parameter is related to the number of times the sales lead generation prompt has been played to the caller.

3. The method as defined in claim 1, wherein the first parameter is related to a designation previously provided by the user with respect to the caller.

4. The method as defined in claim 1, wherein the first parameter is related to whether the caller is already a call processing system subscriber.

5. The method as defined in claim 1, wherein the first call was forwarded to the call processing system as a result of a forward call on busy, ring-no-answer, or do-not-disturb condition.

6. The method as defined in claim 1, wherein the first call was connected directly to the call processing system.

7. The method as defined in claim 1, further comprising automatically populating at least a portion of a first form using the caller identification information.

8. A method of processing a call, the method compromising:
receiving at a call processing system a first call from a caller, the first call intended for a user, the first call including associated signaling information;
playing a greeting to the caller asking the caller if the caller wants to record a message for the user;
determining if a sales lead generation prompt is to be played to the caller based on information related to one or more of the following:
whether the sales lead generation prompt has been previously played with respect to a previous call associated with caller identification information obtained from the signaling information;
a designation previously provided by the user with respect to the caller;
whether the caller identification information obtained from the signaling information is associated with a subscriber of at least a first call processing service;
playing the sales lead generation prompt to the caller in accordance with the determination;
receiving an instruction from the caller provided at least partly in response to the sales lead generation prompt;
at least partly in response to receiving the instruction, requesting information from the caller; and
recording requested information from the caller.

9. The method as defined in claim 8, further comprising:
recording a voice message from the caller for the ealled-party user during the first call; and
determining when the caller has completed recording the voice message prior to playing the sales lead generation prompt to the caller.

10. The method as defined in claim 8, further comprising providing call processing services for the caller based at least in part on the recorded information.

11. The method as defined in claim 8, further comprising connecting the caller to a call center live agent at least partly in response to the caller instruction.

12. The method as defined in claim 8, further comprising:
connecting the caller to an automated information gathering system at least partly in response to the caller instruction;
requesting that the caller verbally provide information to be used to set up a call services account;
recording the verbally provided information; and
transmitting at least a portion of the verbally provided information to a service person.

13. The method as defined in claim 8, further comprising accessing identification information associated with the caller, wherein prior to playing the sales lead generation prompt, accessing information indicating how many times the sales lead generation prompt has been played to the caller.

14. The method as defined in claim 8, further comprising accessing identification information associated with the caller, wherein prior to playing the sales lead generation prompt, accessing information indicating how the first call reached the call processing system.

15. The method as defined in claim 8, further comprising accessing identification information associated with the caller, wherein prior to playing the sales lead generation prompt, accessing a designation provided by the user related to the caller.

16. The method as defined in claim 8, further comprising accessing identification information associated with the caller, wherein prior to playing the sales lead generation prompt, accessing information indicating whether the caller is already a subscriber of a service provided by the call processing system.

17. The method as defined in claim 8, wherein the first call was forwarded to the call processing system as a result of a forward call on busy, ring-no-answer, or do-not-disturb condition.

18. The method as defined in claim 8, wherein the first call was connected directly to the call processing system.

19. The method as defined in claim 8, further comprising automatically populating at least a portion of a first registration form using the caller identification information, wherein at least a portion of the requested information is manually entered into the registration form.

20. The method as defined in claim 8, further comprising:
recording a voice message from the caller during the first call; and
streaming the voice message to the user in substantially real time.

21. The method as defined in claim 8, further comprising:
initiating a second call to a call center; and
populating an ANI field associated with the second call with a phone number obtained from an ANI field associated with the first call so that caller identification information can be presented to a call center agent.

22. The method as defined in claim 8, further comprising:
receiving a second call with associated caller identification information from the caller;
based at least in part on the identification information, accessing information indicating how many times the sales lead generation prompt has been played to the caller; and
based at least in part on the accessed information, determining whether to play the sales lead generation prompt to the caller again.

23. The method as defined in claim 8, further comprising:
receiving a second call with associated caller identification information from a second caller; and based at least in part on the identification information, accessing information indicating whether a request has been made to not provide sales lead generation prompts to the second caller; and based at least in part on the accessed information, determining whether to play the sales lead generation prompt to the second caller.

24. The method as defined in claim 8, wherein the greeting has been selected by the user.

25. A call processing system, comprimising:
a first telephony interface configured to receive a call from a caller;
a storage device configured to store a greeting; and
a call answering system configured to:
    play the greeting in response to receiving the call;
    record a voice message from the caller;
    determine if a prompt regarding the caller becoming a subscriber to a call service is to be played to the caller based on information related to one or more of the following:
        whether the prompt has been previously played with respect to a previous call associated with caller identification information obtained from call signaling information;
        a designation previously provided by the user with respect to the caller;
        whether caller identification information obtained from call signaling information is associated with a subscriber of at least a first call processing service;
    determine when the caller has completed recording the voice message;
    after determining that the caller has completed recording the voice message and that the prompt is to be played, play the prompt; and
    receive from the caller information used to establish a call services account.

26. The call processing system as defined in claim 25, wherein the call answering system is further configured to establish a call services account for the caller.

27. The call processing system as defined in claim 25, further comprising a call center, wherein the caller information is received by a call center agent in substantially real time.

28. The call processing system as defined in claim 25, further comprising a client application configured to execute on a computer system associated with a user for whom the call was intended, wherein the call answering system streams the caller voice message to the client as the message is being recorded.

29. The call processing system as defined in claim 25, further comprising a database the stores a value related to the number of times the prompt has been played with respect to a telephone number associated with the caller.

30. The call processing system as defined in claim 25, further comprising an automated information gathering system used to prompt the caller for the information used to establish the call services account.

31. The call processing system as defined in claim 25, further comprising an email client used to transmit a voice file including the caller information to a call center.

32. The call processing system as defined in claim 25, further comprising a first instruction stored in computer readable memory configured to determine whether the call was forwarded to the call processing system.

33. The call processing system as defined in claim 25, further comprising a first instruction stored in computer readable memory configured to determine whether the a user for whom the call was intended has provided an indication that promotional prompts are not to be played to the caller.

34. The call processing system as defined in claim 25, further comprising a first instruction stored in computer readable memory configured to access identification information associated with the caller and to access information indicating whether the caller is already a subscriber of a service provided by the call processing system prior to playing the prompt.

35. The call processing system as defined in claim 25, further comprising a first instruction stored in computer readable memory configured to access identification information associated with the caller and to automatically populate least a portion of a first form using the caller identification information.

36. A method of processing a call, the method comprimising:
receiving at a call processing system a first call from a caller, the first call intended for a user;
determining if a solicitation prompt is to be played to the caller, the prompt soliciting the caller to take a first action if the caller wants to subscribe to at least a first service, wherein the determination is at least partly based on information related to one or more of the following:
    whether the prompt has been previously played with respect to a previous call associated with caller identification information obtained from call signaling information;
    a designation previously provided by the user with respect to the caller;
    whether caller identification information obtained from call signaling information is associated with a subscriber of at least a first service;
playing a solicitation prompt to the caller during the first call in accordance with the determination;
at least partly in response to the first action, requesting account information from the caller;
recording the requested account information from the caller, wherein at least a portion of the account information is to be used to provide the at least first service to the caller; and
during the first call, recording a voice message from the caller for the user.

37. The method as defined in claim 36, further comprising providing call processing services for the caller using recorded account information.

38. The method as defined in claim 36, further comprising connecting the caller to a call center live agent at least partly in response to the caller action.

39. The method as defined in claim 36, further comprising:
connecting the caller to an automated information gathering system at least partly in response to the caller action;
requesting that the caller verbally provide information to be used to set up an account;
recording the verbally provided information; and
transmitting at least a portion of the verbally provided information to a service person.

40. The method as defined in claim 36, further comprising accessing identification information associated with the caller prior to playing the prompt related to how many times the prompt has been played to the caller.

41. The method as defined in claim 36, further comprising accessing identification information associated with the caller prior to playing the prompt indicating whether the caller is already a subscriber of at the least first service.

42. The method as defined in claim 36, wherein the first call was forwarded to the call processing system as a result of a forward call on busy, ring-no-answer, or do-not-disturb condition.

43. The method as defined in claim 36, wherein the first call was connected directly to the call processing system.

44. The method as defined in claim 36, further comprising streaming the voice message from the caller to the user in substantially real time.

45. The method as defined in claim 36, further comprising:
  initiating a second call to a call center; and
  populating an ANI field associated with the second call with a phone number obtained from an ANI field associated with the first call so that caller identification information can be presented to a call center agent.

46. The method as defined in claim 36, further comprising:
receiving a second call from with associated caller identification information from the caller;
  based at least in part on the identification information, accessing information indicating many times the prompt has been played to the caller; and
  based at least in part on the accessed information, determining whether to play the prompt to the caller again.

47. The method as defined in claim 36, further comprising:
  receiving a second call associated caller identification information from a second caller; and
  based at least in part on the identification information, accessing information indicating whether a request has been made not provide solicitation prompts to the second caller; and
  based at least in part on the accessed information, determining whether to play the solicitation prompt to the second caller.

48. A method of processing a call, the method compromising:
  receiving at a call processing system a first call from a caller, the first call intended for a user, the first call including associated signaling information;
  playing a greeting to the caller during the first call asking the caller if the caller wants to record a message for the user;
  determining if a first parameter related to the caller is met based at least in part on information retrieved from a data store using the caller identification information;
  based at least in part on the first parameter being met, playing a solicitation prompt to the caller during the first call, wherein the first parameter is related to:
    whether the prompt has been previously played with respect to a previous call associated with caller identification information;
    a designation previously provided by the user with respect to the caller; and/or
    whether caller identification information obtained from call signaling information is associated with a subscriber of at least one service;
    receiving an instruction from the caller provided at least partly in response to the solicitation prompt;
  at least partly in response to receiving the instruction, requesting information from the caller; and
  recording requested information from the caller.

49. The method as defined in claim 48, the method further comprising determining whether the playing of the solicitation prompt is enabled for the user.

50. The method as defined in claim 48, the method further comprising determining whether the playing of the solicitation prompt is enabled for a class of service associated with the user.

51. The method as defined in claim 48, the method further comprising determining whether the playing of the solicitation prompt is enabled.

52. The method as defined in claim 48, further comprising determining whether the playing of the solicitation prompt is enabled for the time and/or for the day of the first call.

53. The method as defined in claim 48, further comprising determining whether a service person is available to process the caller prior to playing of the solicitation prompt.

54. A method of processing a call at a call processing system, the method compromising:
  receiving at a call processing system a first call from a caller, the first call intended for a user, the first call including associated signaling information;
  obtaining caller identification information from the signaling information;
  transmitting notification information to a computer associated with the user;
  establishing a 2-way talk path between the call processing system and the caller;
  playing a greeting to the caller;
  recording a voice message from the caller;
  determining when the caller has completed recording the voice message;
  determining if a first parameter related to the caller is met based at least in part on information retrieved from a data store using the caller identification information, wherein the first parameter is related to the number of times the sales lead generation prompt has been played to the caller;
  based at least in part on the first parameter being met, playing a sales lead generation prompt;
  receiving an instruction from the caller provided at least partly in response to the sales lead generation prompt;
  based at least in part on the response,
  originating a second call to a call center;
  bridging the first call and the second call;
  receiving information from the caller at the call center; and
  establishing an account for the caller using at least a portion of the received information.

55. A method of processing a call at a call processing system, the method compromising:
  receiving at a call processing system a first call from a caller, the first call intended for a user, the first call including associated signaling information;
  obtaining caller identification information from the signaling information;
  transmitting notification information to a computer associated with the user;
  establishing a 2-way talk path between the call processing system and the caller;
  playing a greeting to the caller;
  recording a voice message from the caller;
  determining when the caller has completed recording the voice message;
  determining if a first parameter related to the caller is met based at least in part on information retrieved from a data store using the caller identification information, wherein the first parameter is related to a designation previously provided by the user with respect to the caller;
  based at least in part on the first parameter being met, playing a sales lead generation prompt;
  receiving an instruction from the caller provided at least partly in response to the sales lead generation prompt;
  based at least in part on the response,
  originating a second call to a call center;
  bridging the first call and the second call;

receiving information from the caller at the call center; and
establishing an account for the caller using at least a portion of the received information.

56. A method of processing a call at a call processing system, the method compromising:
receiving at a call processing system a first call from a caller, the first call intended for a user, the first call including associated signaling information;
obtaining caller identification information from the signaling information;
transmitting notification information to a computer associated with the user;
establishing a 2-way talk path between the call processing system and the caller;
playing a greeting to the caller;
recording a voice message from the caller;
determining when the caller has completed recording the voice message;
determining if a first parameter related to the caller is met based at least in part on information retrieved from a data store using the caller identification information, wherein the first parameter is related to whether the caller is already a call processing system subscriber;
based at least in part on the first parameter being met, playing a sales lead generation prompt;
receiving an instruction from the caller provided at least partly in response to the sales lead generation prompt;
based at least in part on the response,
originating a second call to a call center;
bridging the first call and the second call;
receiving information from the caller at the call center; and
establishing an account for the caller using at least a portion of the received information.

* * * * *

UNITED STATES PATENT AND TRADEMARK OFFICE
CERTIFICATE OF CORRECTION

PATENT NO. : 7,409,048 B2
APPLICATION NO. : 11/008779
DATED : August 5, 2008
INVENTOR(S) : Trandal et al.

Page 1 of 1

It is certified that error appears in the above-identified patent and that said Letters Patent is hereby corrected as shown below:

Title Page; item (56);

At Page 2 Col. 2 (Other Publications), line 61, delete "Buisness" and insert -- Business --, therefor.

At column 9, line 53, delete "finished." and insert -- finished --, therefor.

At column 15, lines 57-58, in Claim 9, after "for the" delete "ealled-party".

At column 17, line 51, in Claim 29, after "database" delete "the" and insert -- that --, therefor.

At column 17, line 67, in Claim 33, after "whether the" delete "a".

At column 18, line 67, in Claim 41, after "at" delete "the".

Signed and Sealed this

Third Day of March, 2009

JOHN DOLL
*Acting Director of the United States Patent and Trademark Office*